US009599984B2

(12) United States Patent
Matsumoto et al.

(10) Patent No.: US 9,599,984 B2
(45) Date of Patent: Mar. 21, 2017

(54) VEHICLE SYSTEM, PORTABLE DEVICE, AND VEHICLE-MOUNTED DEVICE

(71) Applicants: DENSO CORPORATION, Kariya, Aichi-pref. (JP); NIPPON SOKEN, INC., Nishio, Aichi-pref. (JP)

(72) Inventors: Munenori Matsumoto, Nishio (JP); Koji Sakamoto, Kariya (JP); Kenji Katou, Kariya (JP); Yuki Tokunaga, Kariya (JP)

(73) Assignees: DENSO CORPORATION, Kariya, Aichi-pref (JP); NIPPON SOKEN, INC., Nishio, Aichi-pref (JP)

( * ) Notice: Subject to any disclaimer, the term of this patent is extended or adjusted under 35 U.S.C. 154(b) by 0 days.

(21) Appl. No.: 14/911,304

(22) PCT Filed: Jul. 15, 2014

(86) PCT No.: PCT/JP2014/003742
§ 371 (c)(1),
(2) Date: Feb. 10, 2016

(87) PCT Pub. No.: WO2015/025464
PCT Pub. Date: Feb. 26, 2015

(65) Prior Publication Data
US 2016/0202697 A1    Jul. 14, 2016

(30) Foreign Application Priority Data

Aug. 21, 2013 (JP) .................................. 2013-171579

(51) Int. Cl.
*G05D 3/00* (2006.01)
*G05D 1/00* (2006.01)
(Continued)

(52) U.S. Cl.
CPC .......... *G05D 1/0016* (2013.01); *B60R 25/245* (2013.01); *G05D 1/0022* (2013.01); *G08C 17/02* (2013.01)

(58) Field of Classification Search
None
See application file for complete search history.

(56) References Cited

U.S. PATENT DOCUMENTS 6,100,603 A    8/2000  Gold
7,327,322 B2 *  2/2008  Capps ..................... H01Q 1/44
                                                                   343/711
(Continued)

FOREIGN PATENT DOCUMENTS

JP    H11324441 A    11/1999
JP    2003013644 A    1/2003
(Continued)

OTHER PUBLICATIONS

International Search Report and Written Opinion (in Japanese with English Translation) for PCT/JP2014/003742, mailed Sep. 9, 2014; ISA/JP.

*Primary Examiner* — Adam Alharbi
(74) *Attorney, Agent, or Firm* — Harness, Dickey & Pierce, P.L.C.

(57) ABSTRACT

A vehicle system includes a vehicle-mounted device mounted to a vehicle and a portable device portable by a user, and performs a control to the vehicle corresponding to a collation result performed based on a wireless communication established between the vehicle-mounted device and the portable device. The vehicle-mounted device includes a vehicle-mounted transmission unit which simultaneously transmits radio waves having a predetermined phase difference using at least two transmission antennas disposed orthogonal to each other. The portable device includes a triaxial reception antenna receiving the at least two radio
(Continued)

waves, and a magnetic field strength detection unit detecting a magnetic field strength on each of three axes of the triaxial reception antenna. One of the vehicle-mounted device or the portable device includes an illicitness determination unit determining, based on the detected magnetic field strength, whether the wireless communication is established through an illicit repeater.

9 Claims, 10 Drawing Sheets

(51) Int. Cl.
    *B60R 25/24*     (2013.01)
    *G08C 17/02*     (2006.01)

(56) References Cited

U.S. PATENT DOCUMENTS

| | | | |
|---|---|---|---|
| 7,340,283 B1* | 3/2008 | Melick | G01S 19/11 342/357.29 |
| 2003/0001723 A1 | 1/2003 | Masudaya | |
| 2010/0231465 A1 | 9/2010 | Tanaka | |

FOREIGN PATENT DOCUMENTS

| | | | |
|---|---|---|---|
| JP | 2010236346 A | 10/2010 | |
| JP | 2011144625 A | 7/2011 | |
| JP | 2012067500 A | 4/2012 | |
| JP | 2013083081 A | 5/2013 | |
| JP | 2013083096 A | 5/2013 | |

* cited by examiner

LAYOUT PATTERN 1

LAYOUT PATTERN 2

LAYOUT PATTERN 3

LAYOUT PATTERN 4

VEHICLE SYSTEM, PORTABLE DEVICE, AND VEHICLE-MOUNTED DEVICE

CROSS-REFERENCE TO RELATED APPLICATIONS

This application is a U.S. National Phase Application under 35 U.S.C. 371 of International Application No. PCT/JP2014/003742 filed on Jul. 15, 2014 and published in Japanese as WO 2015/025464 A1 on Feb. 26, 2015. This application is based on and claims the benefit of priority from Japanese Patent Application No. 2013-171579 filed on Aug. 21, 2013. The entire disclosures of all of the above applications are incorporated herein by reference.

TECHNICAL FIELD

The present disclosure relates to a vehicle system that performs a collation between a portable device and a vehicle-mounted device both of which are included in the vehicle system and wirelessly communicable with each other. The present disclosure also relates to the portable device and the vehicle-mounted device included in the vehicle system.

BACKGROUND ART

It is known that smart drive for activating a device is performed in a so-called smart system. Smart drive is performed, for instance, to unlock doors or start a vehicle drive device by controlling a portable device to receive a request signal transmitted from a vehicle and to respond an reply signal from the portable device to the vehicle.

It is anticipated that the smart system may suffer a relay attack. Even when the portable device is positioned at a communication incapable distance from the vehicle, a malicious person may perform a relay attack by indirectly establishing communication between the portable device and the vehicle using repeaters and cause the vehicle to perform smart drive.

In a relay attack, a repeater A of a first malicious person is positioned within a communication range of the vehicle, and a repeater B of a second malicious person is positioned near the portable device within a communication range of the vehicle mounted device. The repeater B receives a request signal transmitted from the vehicle, converts the request signal to a relay signal having a long-distance communication range, and transmits the relay signal to the repeater B. Further, the repeater B receives the relay signal, converts the received relay signal to the request signal, and transmits the request signal to the portable device. When receiving the converted request signal from the repeater B, the portable device transmits reply signal. When receiving the reply signal from the portable device, the vehicle mounted device controls the vehicle to perform smart drive.

As a countermeasure technology for the above-described relay attack, a technology disclosed in Patent Literature 1 makes use of a delay in a response that is caused when a repeater operates during the time interval between the instant at which the vehicle transmits the request signal and the instant at which the vehicle receives the reply signal. The technology disclosed in Patent Literature 1 recognizes the received reply signal as an authenticated reply signal only when the time interval between request signal transmission time and reply signal reception time is equal to or shorter than a predetermined effective duration.

Meanwhile, as a countermeasure technology for the above-described relay attack, another technology disclosed in Patent Literature 2 performs common logical operations based on collation data to randomly change frequencies so that the same reception frequencies and transmission frequencies are used at the vehicle and the portable device.

In the technology disclosed in Patent Literature 1, in order to accurately recognize an illicit reply signal involved in a relay attack, it is necessary that the effective duration needs to be set to a relatively short duration. However, a problem is that responsiveness also decreases with a decrease in the effective duration. More specifically, even when an authenticated reply signal is received with a delay due to a delayed response caused by temperature or aging of the devices, the authenticated reply signal may be erroneously recognized as an illicit reply signal.

In the technology disclosed in Patent Literature 2, even when the frequency of the request signal is changed, in a case where a repeater relays the request signal with only amplitude amplification, the portable device may inadvertently transmit a reply signal in response to the request signal.

PRIOR ART LITERATURES

Patent Literature

[Patent Literature 1] JP 2012-67500 A
[Patent Literature 2] JP 2013-13644 A

SUMMARY OF INVENTION

In view of the foregoing difficulties, it is an object of the present disclosure to provide a vehicle system, a portable device, and a vehicle-mounted device each of which is capable of providing improved confidentiality while suppressing a performance decrease in responsiveness.

According to a first aspect of the present disclosure, a vehicle system performing a control to a vehicle includes a vehicle-mounted device mounted to the vehicle and a portable device portable by a user. The vehicle-mounted device is capable of establishing a wireless communication with the portable device and the control to the vehicle is activated corresponding to a result of a collation performed based on the wireless communication established between the vehicle-mounted device and the portable device. The vehicle-mounted device includes a vehicle-mounted transmission unit which simultaneously transmits at least two radio waves having a predetermined phase difference from one another using at least two transmission antennas, and the at least two transmission antennas are disposed orthogonal to each other among a plurality of transmission antennas disposed in the vehicle. The portable device includes a triaxial reception antenna receiving the at least two radio waves transmitted from the at least two transmission antennas and a magnetic field strength detection unit detecting a magnetic field strength on each of three axes of the triaxial reception antenna. One of the vehicle-mounted device or the portable device includes an illicitness determination unit determining, based on the magnetic field strength detected by the magnetic field strength detection unit on each of the three axes, whether the wireless communication is established through an illicit repeater.

As described above, at least two radio waves having the predetermined phase difference are transmitted simultaneously from at least two transmission antennas disposed orthogonal to each other. This configuration makes it possible to generate a rotating magnetic field (that is, a circularly-polarized wave). When the rotating magnetic field is generated, an axis having the highest magnetic field strength among the three axes of the triaxial reception antenna, which is detected by the magnetic field strength detection unit, switches to another axis over time.

An illicit repeater used in a relay attack is generally provided with an antenna having only one axis. Therefore, an output from the repeater does not generate a rotating magnetic field. When the rotating magnetic field is not generated, the magnetic field strength detected on each of the three axes of the triaxial reception antenna by the magnetic field strength detection unit is such that one axis tends to always has a higher magnetic field strength than the remaining two axes.

Consequently, whether or not the wireless communication is established through an illicit repeater can be accurately determined depending on the magnetic field strength detected on each of the three axes of the triaxial reception antenna. This configuration makes it possible to provide improved confidentiality while suppressing a decrease in responsiveness.

According to a second aspect of the present disclosure, a portable device portable by a user and communicably connected to a vehicle-mounted device mounted to a vehicle in a wireless manner includes a triaxial reception antenna, a magnetic field strength detection unit, and an illicitness determination unit. The triaxial reception antenna is equipped to the vehicle and receives radio waves transmitted from a plurality of transmission antennas. The plurality of transmission antennas include at least two transmission antennas disposed orthogonal to each other. The magnetic field strength detection unit detects a magnetic field strength on each of three axes of the triaxial reception antenna. The vehicle-mounted device includes a vehicle-mounted transmission unit that simultaneously transmits at least two radio waves having a predetermined phase difference from the at least two transmission antennas disposed orthogonal to each other. Upon a receipt of the at least two radio waves having the predetermined phase difference and transmitted simultaneously from the vehicle-mounted transmission unit, the illicitness determination unit determines whether a wireless communication is established through an illicit repeater based on the detected magnetic field strength on each of the three axes.

The above-described portable device makes it possible to provide improved confidentiality while suppressing a decrease in responsiveness.

According to a third aspect of the present disclosure, a vehicle-mounted device mounted to a vehicle and communicably connected to a portable device portable by a user includes a vehicle-mounted transmission unit and an illicitness determination unit. The vehicle-mounted transmission unit simultaneously transmits at least two radio waves having a predetermined phase difference from at least two transmission antennas disposed orthogonal to each other among a plurality of transmission antennas equipped to the vehicle. The portable device includes a triaxial reception antenna receiving the at least two radio waves transmitted from the at least two transmission antennas and a magnetic field strength detection unit detecting a magnetic field strength on each of the three axes of the triaxial reception antenna. Upon a receipt of the at least two radio waves having the predetermined phase difference and transmitted simultaneously from the vehicle-mounted transmission unit, the portable device transmits the magnetic field strength on each of the three axes, which is detected by the magnetic field strength detection unit, to the illicitness determination unit. The illicitness determination unit determines whether a wireless communication is established through an illicit repeater based on the magnetic field strength on each of the three axes, which is detected by the magnetic field strength detection unit and transmitted from the portable device.

The above-described vehicle-mounted device makes it possible to provide improved confidentiality while suppressing a decrease in responsiveness.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Embodiments of the present disclosure will now be described with reference to the accompanying drawings.

(First Embodiment)

Figure 1:
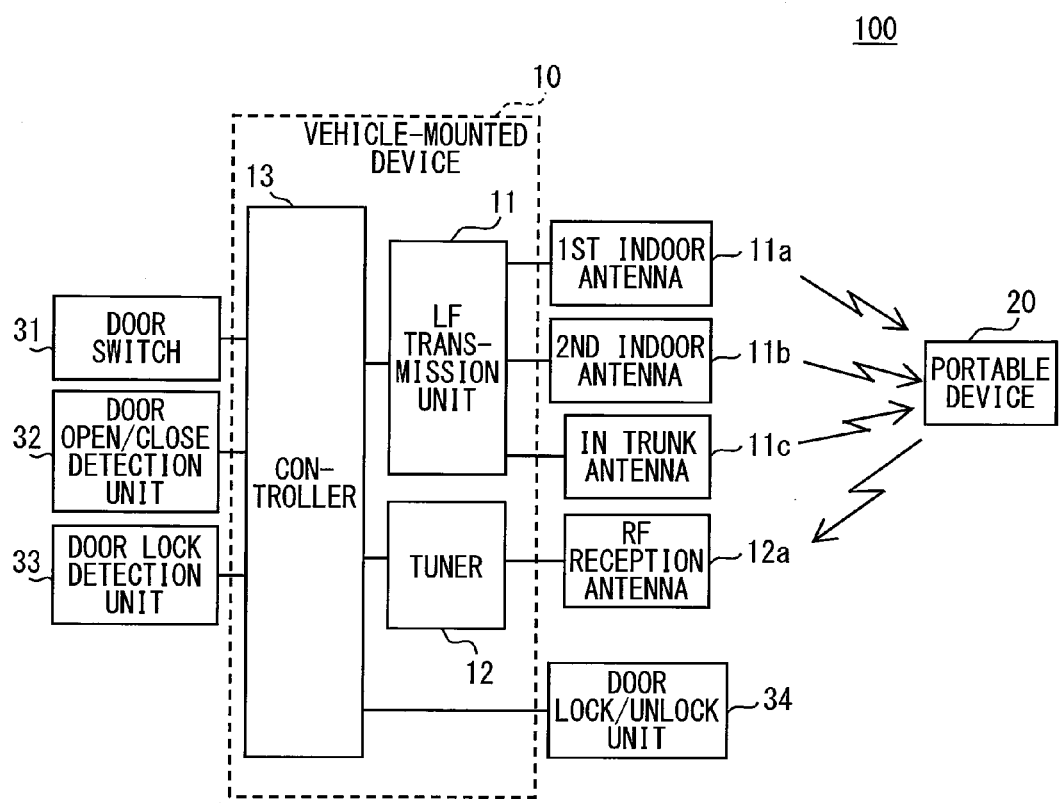
FIG. 1 is a schematic block diagram illustrating an exemplary configuration of a vehicle system according to an embodiment of the present disclosure.

In a first embodiment of the present disclosure, a vehicle system 100 is implemented as one function of a smart entry system. FIG. 1 is a schematic diagram illustrating an exemplary configuration of the vehicle system 100. The vehicle system shown in FIG. 1 includes a vehicle-mounted device 10 and a portable device 20. The vehicle-mounted device is mounted to a vehicle.

The vehicle-mounted device 10 transmits a collation signal to the portable device 20 through wireless communication, and collates or authenticates the portable device 20 by receiving a signal that is replied from the portable device 20. Herein, the portable device 20 transmits the reply signal to the vehicle-mounted device 10 in response to a reception of the collation signal. When the collation is successful, the vehicle-mounted device 10 performs a control to lock or unlock the vehicle doors. As shown in FIG. 1, the vehicle-mounted device 10 includes an LF transmission unit 11, a tuner 12, and a controller 13.

The LF transmission unit 11 is connected to transmission antennas, which include a first indoor antenna 11a, a second indoor antenna 11b, and an in trunk antenna 11c. The first indoor antenna 11a and the second indoor antenna 11b are disposed in a vehicle compartment. The in trunk antenna 11c is disposed in a trunk of the vehicle. At least two of the transmission antennas 11a-11c are disposed orthogonal to each other. The arrangement of the first indoor antenna 11a, the second indoor antenna 11b, and the in trunk antenna 11c will be described later in further detail.

The LF transmission unit 11 receives signals transmitted from the controller 13 and sequentially transmits the received signals from the antennas 11a-11c in a time-sharing manner by using LF band radio waves. The antennas 11a-11c correspond to the transmission antennas. The transmission frequencies of the antennas 11a-11c are identical with each other. For example, the antennas 11a-11c may use a 21 kHz band frequency, a 125 kHz band frequency, or a 134 kHz band frequency.

The LF transmission unit 11 is capable of transmitting LF band radio waves having an arbitrary phase difference from the antennas 11a-11c. For example, the LF transmission unit 11 is capable of simultaneously transmitting LF band radio waves with the same phase from the antennas 11a-11c, and is also capable of simultaneously transmitting LF band radio waves having a predetermined phase difference from the antennas 11a-11c. The LF transmission unit 11 corresponds to a vehicle-mounted transmission unit.

The predetermined phase difference may be set such that a rotating magnetic field is generated in a region where magnetic field generation areas of respective transmission antennas disposed orthogonal to each other are overlapped. It is preferred that the predetermined phase difference is set to 90 degrees when two transmission antennas are disposed orthogonal to each other. It is preferred that the predetermined phase difference is set to 120 degrees when three transmission antennas are disposed orthogonal to each other.

Figure 2A:
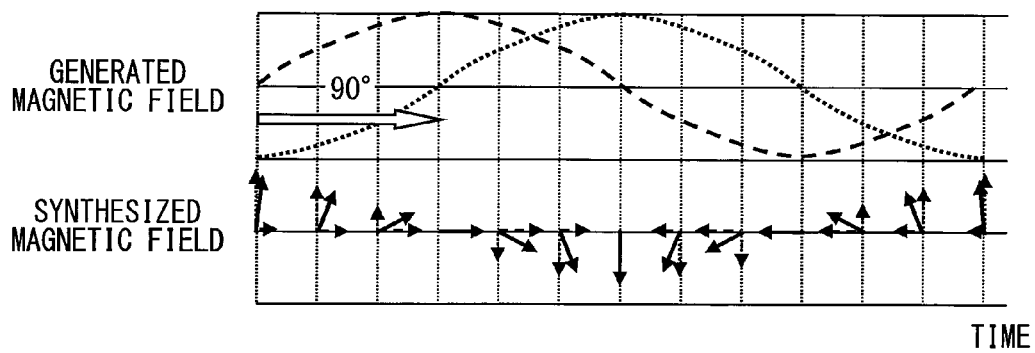
FIGS. 2A and 2B are diagrams illustrating a generation of a rotating magnetic field.
Figure 2B:
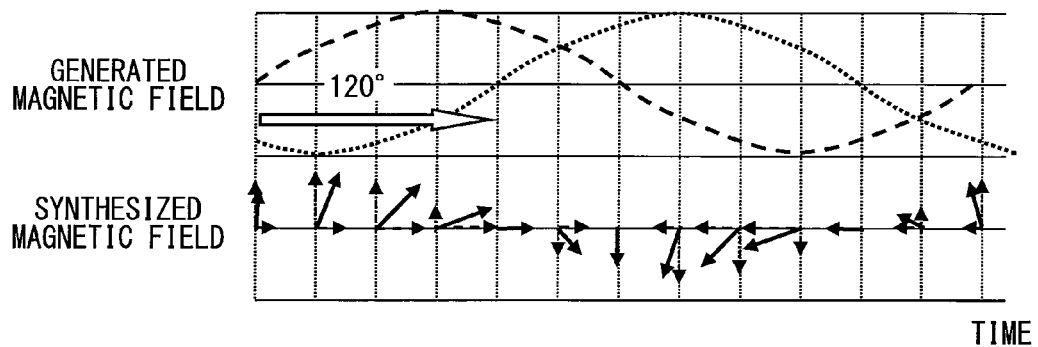

FIG. 2A illustrates an example of a synthesized magnetic field that is obtained when the phase difference between the first indoor antenna 11a and the second indoor antenna 11b is set to 90 degrees. FIG. 2B illustrates an example of the synthesized magnetic field that is obtained when the phase difference between the first indoor antenna 11a and the second indoor antenna 11b is set to 120 degrees.

Each broken line in FIGS. 2A and 2B indicates a change in the strength of a magnetic field generated from the first indoor antenna 11a over time, and broken line arrows in FIGS. 2A and 2B indicate magnetic field vectors of a magnetic field generated from the first indoor antenna 11a. Each dotted line in FIGS. 2A and 2B indicates a change in the strength of a magnetic field generated from the second indoor antenna 11b over time, and dotted-line arrows indicate magnetic field vectors of a magnetic field generated from the second indoor antenna 11b. Solid-line arrows in FIGS. 2A and 2B indicate synthesized magnetic field vectors that are obtained by synthesizing the magnetic field vectors corresponding to the first indoor antenna 11a and the magnetic field vectors corresponding to the second indoor antenna 11b.

Figure 3:
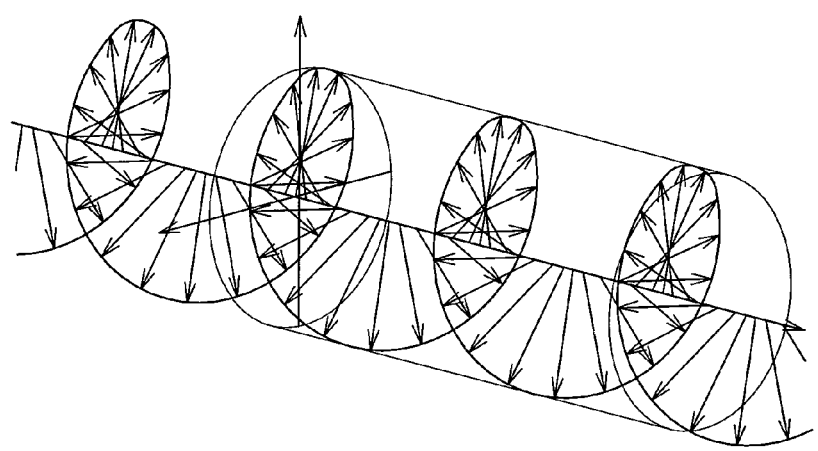
FIG. 3 is a diagram schematically illustrating the rotating magnetic field.
Figure 4A:
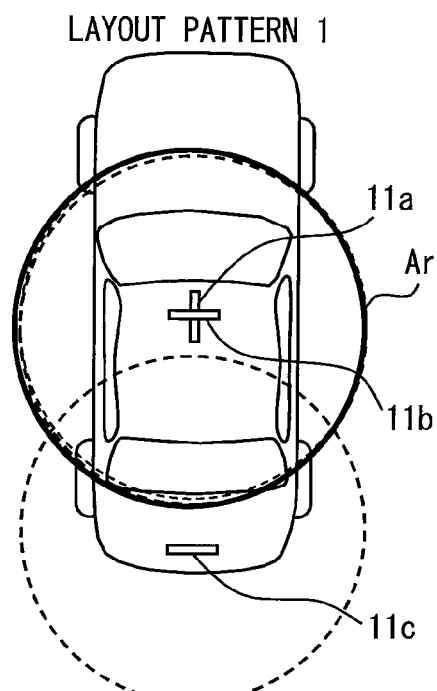
FIGS. 4A to 4D are diagrams illustrating an exemplary layout of antennas.
Figure 4B:
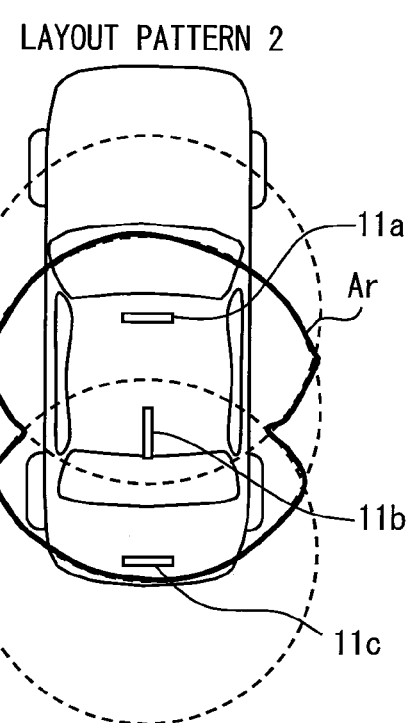
Figure 4C:
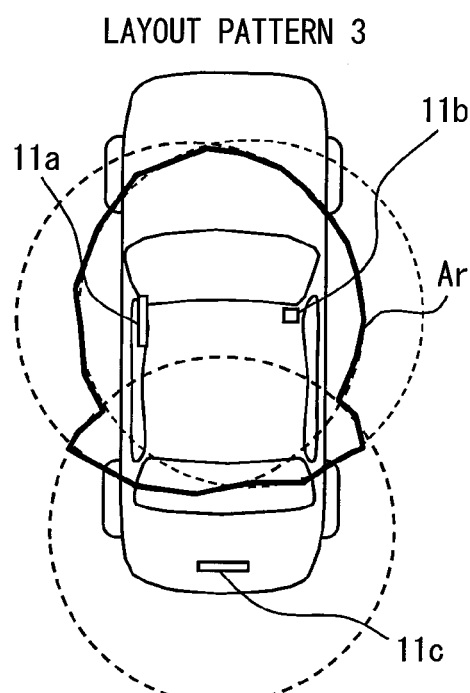
Figure 4D:
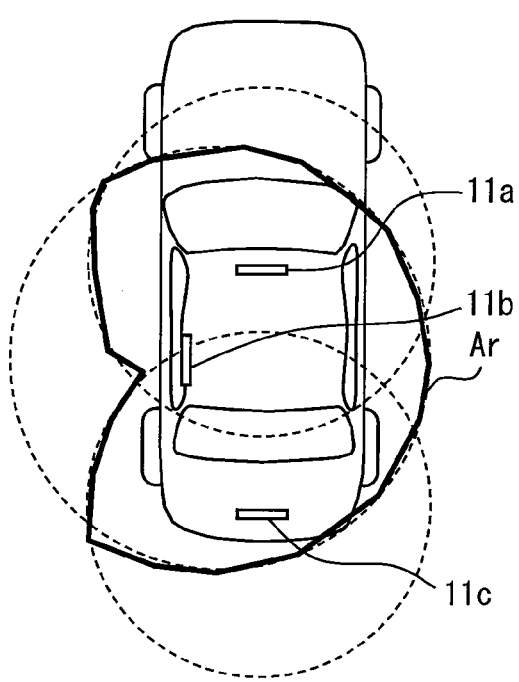

When the phase difference between the first indoor antenna 11a and the second indoor antenna 11b is set to 90 degrees, a rotating magnetic field is generated from a magnetic field of the first indoor antenna 11a and a magnetic field of the second indoor antenna 11b as indicated by the synthesized magnetic field vectors shown in FIG. 2A. Further, when the phase difference between the first indoor antenna 11a and the second indoor antenna 11b is set to 120 degrees, a rotating magnetic field is generated from the magnetic field of the first indoor antenna 11a and the magnetic field of the second indoor antenna 11b as indicated by the synthesized magnetic field vectors shown in FIG. 2B. An image of the generated rotating magnetic field, that is, a circularly-polarized wave, is as shown in FIG. 3.

An exemplary layout of the first indoor antenna 11a, the second indoor antenna 11b, and the in trunk antenna 11c will now be described with reference to FIGS. 4A to 4D. For example, the first indoor antenna 11a, the second indoor antenna 11b, and the in trunk antenna 11c may be disposed in four different patterns, namely, layout patterns 1 to 4, as shown in FIGS. 4A to 4D. Broken-line circles in FIGS. 4A to 4D indicate a radio wave transmission range of the antennas 11a-11c. Ranges enclosed by solid lines Ar in FIGS. 4A to 4D indicate a later-described rotating magnetic field generation area.

In layout pattern 1, the first indoor antenna 11a and the second indoor antenna 11b are disposed near a center console and positioned orthogonal to each other. Further, the in trunk antenna 11c is disposed in the trunk and positioned orthogonal to the first indoor antenna 11a. In other words, in layout pattern 1, the first indoor antenna 11a and the second indoor antenna 11b are disposed orthogonal to each other, and the first indoor antenna 11a and the in trunk antenna 11c are disposed orthogonal to each other.

In layout pattern 2, the first indoor antenna 11a is positioned near the center console, the second indoor antenna 11b is positioned on a rear seat, and the first indoor antenna 11a and the second indoor antenna 11b are disposed orthogonal to each other. Further, the in trunk antenna 11c is placed in the trunk and positioned orthogonal to the second indoor antenna 11b. In other words, in layout pattern 2, the first indoor antenna 11a and the second indoor antenna 11b are disposed orthogonal to each other, and the second indoor antenna 11b and the in trunk antenna 11c are disposed orthogonal to each other.

In layout pattern 3, the first indoor antenna 11a is positioned near the inner surface of a left front door, the second indoor antenna 11b is positioned near the inner surface of a right front door, and the first indoor antenna 11a and the second indoor antenna 11b are disposed orthogonal to each other. Further, the in trunk antenna 11c is placed in the trunk and positioned orthogonal to both the first indoor antenna 11a and the second indoor antenna 11b. In other words, in layout pattern 3, the first indoor antenna 11a, the second indoor antenna 11b, and the in trunk antenna 11c are disposed orthogonal to each other.

In layout pattern 4, the first indoor antenna 11a is positioned near the center console, the second indoor antenna 11b is positioned near the inner surface of a left rear door, and the first indoor antenna 11a and the second indoor antenna 11b are disposed orthogonal to each other. Further, the in trunk antenna 11c is placed in the trunk and positioned orthogonal to the second indoor antenna 11b. In other words, in layout pattern 4, the first indoor antenna 11a and the second indoor antenna 11b are disposed orthogonal to each other, and the second indoor antenna 11b and the in trunk antenna 11c are disposed orthogonal to each other.

In layout patterns 1, 2, and 4, for example, at most two transmission antennas are disposed orthogonal to each other. Therefore, the phase difference between the two transmission antennas disposed orthogonal to each other may be set to 90 degrees. In layout pattern 3, three transmission antennas are disposed orthogonal to each other. Therefore, the phase difference between the three transmission antennas disposed orthogonal to each other may be set to 120 degrees.

With the above-described configuration, as shown in FIGS. 4A to 4D, the rotating magnetic field generation area (shown by solid line areas Ar in FIGS. 4A to 4D) can be extended to the proximity areas beyond the front doors and rear doors no matter which of layout patterns 1 to 4 is applied. In the first embodiment, the antennas 11a-11c are disposed in layout pattern 3 as an example. Therefore, the first embodiment is described on the assumption that the phase difference between the antennas 11a-11c is set to 120 degrees.

In the actual use of the vehicle system 100, the layout pattern is not limited to the exemplary layout patterns 1 to 4. As another example, multiple transmission antennas may be configured so that at least two transmission antennas are disposed orthogonal to each other.

Figure 5:
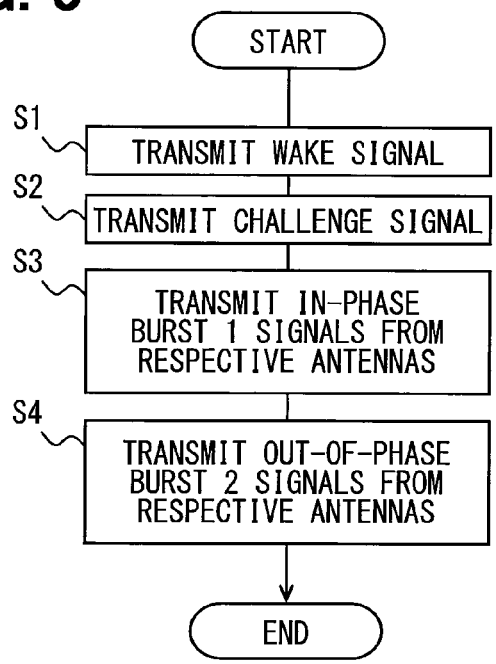
FIG. 5 is a flowchart illustrating an example of a signal transmission related process executed by a vehicle-mounted device according to a first embodiment of the present disclosure.

An example of a signal transmission related process executed by the vehicle-mounted device 10 to transmit signals via LF band radio waves will now be described with reference to the flowchart of FIG. 5. The vehicle-mounted device 10 may start the process shown in the flowchart of FIG. 5 when a user operates a later-described door switch 31 near a vehicle door and the door switch 31 inputs a signal according to the user operation.

At first, in step S1, the controller 13 instructs the LF transmission unit 11 to transmit a Wake signal, for instance, from the first indoor antenna 11a. Upon completion of step S1, controller 13 proceeds to step S2. When step S1 is performed, the Wake signal outputted from the first indoor antenna 11a is transmitted by being included in LF band radio wave that functions as a carrier wave. The Wake signal switches the portable device 20 from a sleep state to a wakeup state.

In step S2, the controller 13 instructs the LF transmission unit 11 to transmit a Challenge signal, for instance, from the first indoor antenna 11a. Upon completion of step S2, the controller 13 proceeds to step S3. When step S2 is performed, the Challenge signal is outputted from the first indoor antenna 11a is transmitted by being included in LF band radio wave, which functions as a carrier wave.

The Challenge signal includes, for example, a vehicle collation code, which is used for code collation, and phase control data, which is used in a later-described Burst signal. For example, a code specifically assigned to the vehicle may be used as the vehicle collation code. The phase control data is related to in-phase/out-of-phase control for the later-described Burst signal. It is assumed, for example, that the phase control data in the first embodiment provides in-phase Burst signal transmission first, and then provides out-of-phase Burst signal transmission.

In step S3, the controller 13 instructs the LF transmission unit 11 to simultaneously transmit in-phase Burst signals from the antennas 11a-11c. Upon completion of step S3, the controller 13 proceeds to step S4. When step S3 is performed, in-phase Burst signals are simultaneously transmitted from the antennas 11a-11c using LF band radio waves as carrier waves. In this instance, no rotating magnetic field is generated. For the sake of convenience, the in-phase Burst signals that are simultaneously transmitted for the first time are referred to as Burst 1 signals in the embodiment.

In step S4, the controller 13 instructs the LF transmission unit 11 to simultaneously transmit Burst signals 120 degrees out of phase from the antennas 11a-11c. Upon completion of step S4, the process comes to an end. When step S4 is performed, Burst signals 120 being shifted from one another by 120 degrees of phase are simultaneously transmitted from the antennas 11a-11c using LF band radio waves as carrier waves. In this instance, a rotating magnetic field is generated. For the sake of convenience, the out-of-phase Burst signals that are simultaneously transmitted for the second time are referred to as Burst 2 signals in the first embodiment.

Figure 8:
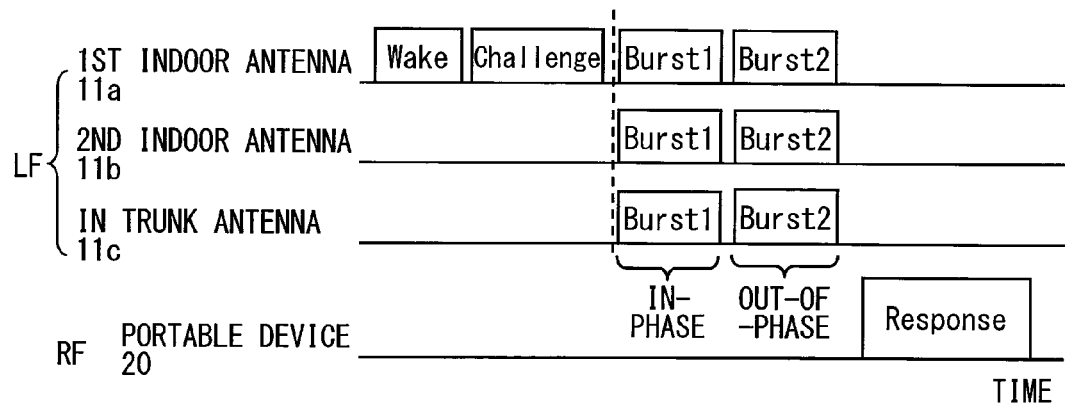
FIG. 8 is a schematic diagram illustrating signals transmitted from the antennas in the first embodiment and a signal replied from the vehicle-mounted device.

As shown in FIG. 8, the first indoor antenna 11a sequentially transmits the Wake signal and the Challenge signal in the described. Subsequently, the antennas 11a-11c simultaneously transmit in-phase Burst 1 signals and simultaneously transmit out-of-phase Burst 2 signals. The Wake signal, all of the Challenge signal, the Burst 1 signal, and the Burst 2 signal are transmitted using LF band radio waves as carrier waves, and hereinafter these signals are referred to as LF signals.

As shown in FIG. 1, the tuner 12 is connected to an RF reception antenna 12a. The tuner 12 amplifies, demodulates, and processes signals received by the RF reception antenna 12a.

The controller 13 is mainly provided by a microcomputer that includes a CPU, a ROM, a RAM, a backup RAM, and an I/O device (these components are not shown), and performs various processes by executing various control programs stored in the ROM. The controller 13 is connected to the LF transmission unit 11, the tuner 12, the door switch 31, a door open/close detection unit 32, a door lock detection unit 33, and a door lock/unlock unit 34.

The door switch 31 is a touch switch that is disposed near a doorknob to open or close a door of the vehicle or disposed near a doorknob of a trunk door of the vehicle. A signal is generated in response to a user operation made to the door switch 31, and the controller 13 acquires the signal from the door switch 31.

The door open/close detection unit 32 is provided by a switch that detects whether the vehicle door or the trunk door is open or closed. The controller 13 acquires a signal indicative of whether the vehicle door or the trunk door is open or closed from the door open/close detection unit 32.

The door lock detection unit 33 is provided by a switch that detects whether the vehicle door or the trunk door is locked or not. The controller 13 acquires a signal indicative of whether the vehicle door or the trunk door is locked or not from the door lock detection unit 33.

The door lock/unlock unit 34 includes actuators that lock or unlock respective doors including the vehicle doors and the trunk door by driving the corresponding actuator.

The portable device 20 will now be described with reference to FIG. 6. The portable device 20 is carried by the user. Here, the expression "carried by the user" does not indicate only a case where the portable device 20 is actually carried by the user. The expression indicates that the portable device 20 is capable of being carried by the user, that is, is portable by the user.

Figure 6:
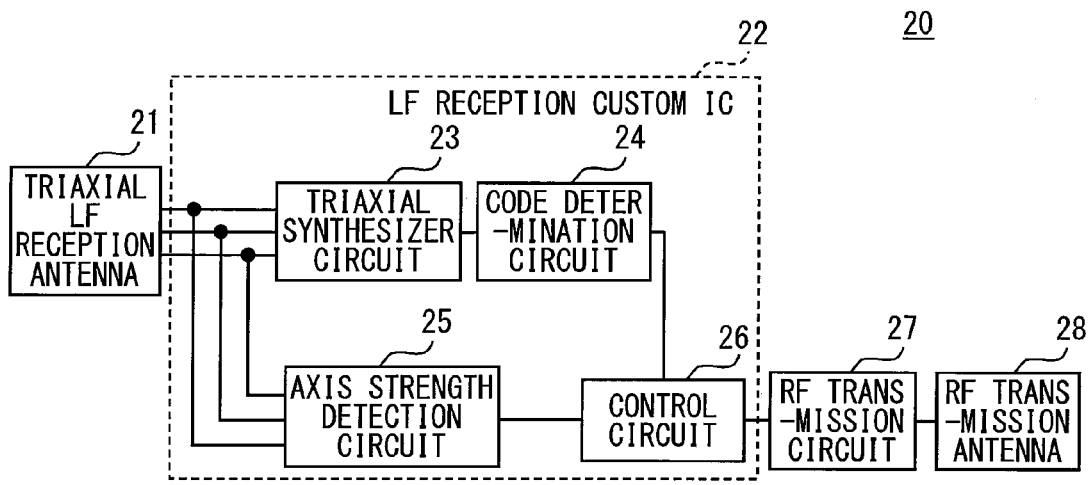
FIG. 6 is a schematic block diagram illustrating an exemplary configuration of a portable device.

As shown in FIG. 6, the portable device 20 includes a triaxial LF reception antenna 21, an LF reception custom IC 22, an RF transmission circuit 27, and an RF transmission antenna 28. The LF reception custom IC 22 includes a triaxial synthesizer circuit 23, a code determination circuit 24, an axis-specific strength detection circuit 25, and a control circuit 26.

The triaxial LF reception antenna 21 receives LF band radio waves that are sequentially transmitted from the vehicle-mounted device 10 in a time-sharing manner. In other words, the triaxial LF reception antenna 21 receives LF signals from the vehicle-mounted device 10. The received LF signals are the aforementioned Wake signal, Challenge signal, Burst 1 signals, and Burst 2 signals. The triaxial LF reception antenna 21 is provided by a triaxial antenna that is oriented in two different horizontal directions (X-axis and Y-axis directions) and in a vertical direction (Z-axis direction). The triaxial LF reception antenna 21 corresponds to a triaxial reception antenna. The X-axis may be referred to as a first axis. The Y-axis may be referred to as a second axis. The Z-axis may be referred to as a third axis.

The triaxial synthesizer circuit 23 synthesizes signals received in X-axis, Y-axis, and Z-axis, which are input from the triaxial LF reception antenna 21. Then, the triaxial synthesizer circuit 23 outputs the synthesized triaxial reception signal to the code determination circuit 24. Upon receipt of the Challenge signal, the code determination circuit 24 performs code collation on the basis of the aforementioned vehicle collation code included in the synthesized triaxial reception signal. The code collation may be performed, for example, to determine whether the vehicle collation code included in the synthesized triaxial reception signal identical to a stored code. The result of the code collation is outputted to the control circuit 26.

The axis-specific strength detection circuit 25 detects a change in the magnetic field strength over time on each axis by sequentially detecting the magnetic field strengths on each of the X-axis, Y-axis, and Z-axis of the triaxial LF reception antenna 21. Data related to the detected over-time change in the magnetic field strength on each axis is outputted to the control circuit 26. The axis-specific strength detection circuit 25 corresponds to a magnetic field strength detection unit.

On the basis of the result of code collation by the code determination circuit 24 and the result of detection by the axis-specific strength detection circuit 25, the control circuit 26 transmits a Response signal through the RF transmission circuit 27 and the RF transmission antenna 28 using RF band radio waves as carrier waves. A process performed by the control circuit 26 will be described later in detail.

An example of a response related process executed by the portable device 20 in response to a reception of LF signals from the vehicle-mounted device 10 will now be described with reference to the flowchart of FIG. 7. The portable device 20 starts the process shown in the flowchart of FIG. 7 when the portable device 20 switches to a wakeup state in response to a reception of the Wake signal from the vehicle-mounted device 10.

In step S21, the triaxial LF reception antenna 21 receives Challenge signals and the triaxial synthesizer circuit 23 synthesizes the Challenge signals received by the triaxial LF reception antenna 21. Upon completion of step S21, the portable device 20 proceeds to step S22. In step S22, the code determination circuit 24 performs the aforementioned code collation on the basis of the vehicle collation code included in the synthesized triaxial reception signal that is generated based on the signals received by the triaxial LF reception antenna 21. Upon completion of step S22, the portable device 20 proceeds to step S23.

When the code collation is successful in step S23 ("YES" in step S23), the portable device 20 proceeds to step S24. When the code collation ends with a failure ("NO" in step S23), the process comes to an end.

In step S24, the triaxial LF reception antenna 21 sequentially receives the Burst 1 signals and the Burst 2 signals. Upon completion of step S24, the portable device 20 proceeds to step S25. In step S25, the control circuit 26 performs an illicitness determination process to determine whether the vehicle-mounted device 10 and the portable device 20 wireless communicate with each other through an illicit repeater. Upon completion of step S25, the portable device 20 proceeds to step S26. The control circuit 26 corresponds to an illicitness determination unit.

On the basis of the phase control data included in the synthesized triaxial reception signal, which is obtained when the received Challenge signals are synthesized by the triaxial synthesizer circuit 23, and the data related to the over-time change in the magnetic field strength on each axis, which is detected by the axis-specific strength detection circuit 25, the illicitness determination process is carried out to determine whether wireless communication is established through an illicit repeater. An example of the illicitness determination process is described below.

On the basis of the phase control data, the control circuit 26 compares the magnetic field strength on each axis during the reception of the simultaneously transmitted in-phase Burst 1 signals with the magnetic field strength on each axis during the reception of the simultaneously transmitted out-of-phase Burst 2 signals. When the compared magnetic field strengths represent the same tendency, the control circuit 26 determines that wireless communication is established through an illicit repeater. When the compared magnetic field strengths represent different tendencies, the control circuit 26 determines that wireless communication is not established through an illicit repeater.

As an example, when a strength ratio among the magnetic field strengths on X-axis, Y-axis, and Z-axis remains substantially the same during the reception of the Burst 1 signals and during the reception of the Burst 2 signals, the control circuit 26 may determine that the compared magnetic field strengths represent the same tendency. Here, the expression "substantially the same" signifies that a detected difference is within a range of tolerance.

As described above, the tendency of the magnetic field strength on each axis of the triaxial LF reception antenna 21 changes or maintains without change during the reception of the Burst 1 signals and during the reception of the Burst 2 signals depending on whether the wireless communication is established through an illicit repeater or not. The following will describe details of the change of tendency of the magnetic field strength on each axis of the triaxial LF reception antenna 21.

It is generally believed that a repeater used in a relay attack has a uniaxial antenna in most cases. Therefore, in a case where the wireless communication is established through an illicit repeater, the magnetic field strength on only one particular axis of the triaxial LF reception antenna 21 is high no matter whether the Burst 1 signals or the Burst 2 signals are received.

Figure 9:
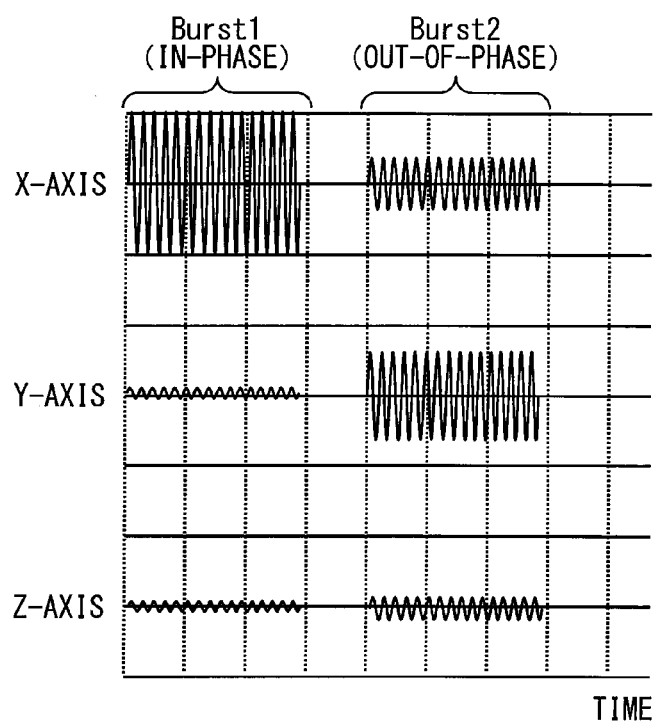
FIG. 9 is a diagram illustrating an illicitness determination process in the first embodiment.

When wireless communication is not established through an illicit repeater, no rotating magnetic field is generated during the reception of the Burst 1 signals and a rotating magnetic field is generated during the reception of the Burst 2 signals. Therefore, as indicated by an example shown in FIG. 9, the magnetic field strength on only one particular axis is high relative to remaining axes during the reception of the Burst 1 signals. During the reception of the Burst 2 signals, the magnetic field strength on a different axis, which is different from the axis having the highest magnetic field strength during the reception of Burst 1 signals, has the highest level, and the magnetic field strengths on the remaining axes are also increased.

Since the magnetic field strengths have the above-described tendency, whether wireless communication is established through an illicit repeater can be determined from the tendency of the magnetic field strength on each axis of the triaxial LF reception antenna 21 during the reception of the Burst 1 signals and during the reception of the Burst 2 signals.

Figure 7:
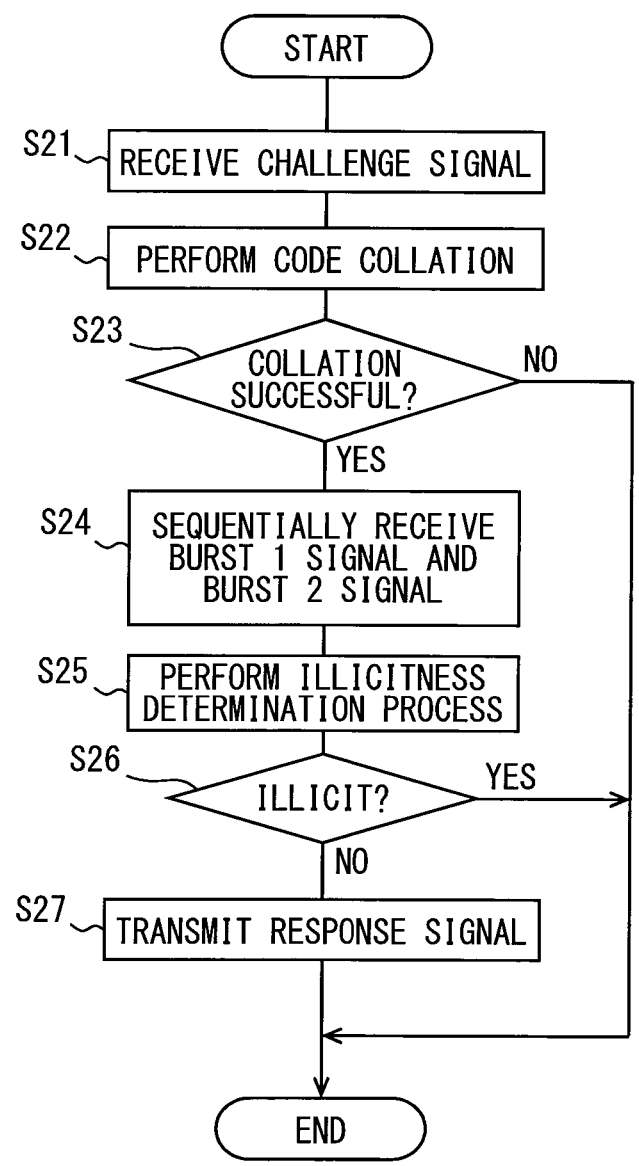
FIG. 7 is a flowchart illustrating an example of a response related process executed by the portable device.

As shown in FIG. 7, when the portable device 20 determines in step S26 that wireless communication is established through an illicit repeater ("YES" in step S26), the process comes to an end without transmitting the later-described Response signal. When the portable device determines in step S26 that wireless communication is not established through an illicit repeater ("NO" in step S26), the process proceeds to step S27.

In step S27, the control circuit 26 transmits the Response signal through the RF transmission circuit 27 and the RF transmission antenna 28 using RF band radio waves as carrier waves. Upon completion of step S27, the process comes to an end. The Response signal includes, for example, a portable device collation code specifically assigned to the portable device 20.

The present embodiment is described on the assumption that the Challenge signal includes the phase control data. However, the present disclosure is not limited to such a configuration of the Challenge signal. Alternatively, the Challenge signal may not include the phase control data. Another alternative is to let the Challenge signal randomly include the phase control data and perform the aforementioned illicitness determination process on the basis of the phase control data in order to make it difficult to use an intervening repeater and provide improved confidentiality.

Figure 10:
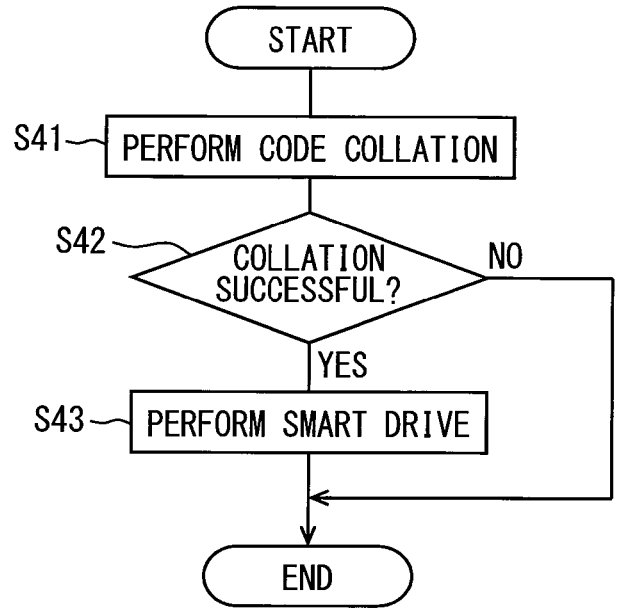
FIG. 10 is a flowchart illustrating an example of a process executed by the vehicle-mounted device in response to a reply reception from the portable device.

A process executed by the controller 13 of the vehicle-mounted device 10 in response to a reception of the Response signal from the portable device 20 will now be described with reference to the flowchart of FIG. 10. The controller 13 of the vehicle-mounted device 10 may initiate the process shown in the flowchart of FIG. 10 when the RF reception antenna 12a receives the Response signal from the portable device 20.

In step S41, the controller 13 performs a code collation on the basis of the portable device collation code that is included in the Response signal acquired from the RF reception antenna 12a and the tuner 12. The code collation may be performed, for example, to determine whether the portable device collation code included in the Response signal is identical to a stored code.

When the code collation is successful in step S42 ("YES" in step S42), the controller 13 proceeds to step S43. When the code collation is unsuccessful ("NO" in step S42), the process comes to an end.

In step S43, the vehicle-mounted device 10 activates a smart drive. Upon completion of step S43, the process comes to an end. For example, within a predetermined period of time from a signal corresponding to an operation of the door switch 31 was input to the controller 13, an instruction for unlocking the doors is issued to the door lock/unlock unit 34. In response to such a door unlocking instruction, the door lock/unlock unit 34 unlocks the vehicle doors by activating an actuator for unlocking the vehicle doors. An alternative is to issue, for example, a vehicle engine startup permission in addition to the instruction for unlocking the vehicle doors.

According to the configuration of the present embodiment, whether wireless communication is established through an illicit repeater can be accurately determined on the basis of the magnetic field strength on each axis of the triaxial LF reception antenna 21 during the reception of the simultaneously transmitted in-phase Burst 1 signals and the magnetic field strength on each axis during the reception of the simultaneously transmitted out-of-phase Burst 2 signals. This configuration enables the communication between the portable device 20 and the vehicle-mounted device 10 to provide an improved confidentiality and suppress a decrease in responsiveness at the same time.

When the portable device 20 determines that wireless communication is established through an illicit repeater, the first embodiment does not permit the portable device 20 to transmit the Response signal. However, the present disclosure is not limited to such a configuration. For example, when the portable device 20 determines that wireless communication is established through an illicit repeater, the portable device 20 may transmit the Response signal that includes illicitness determination data indicative of wireless communication established through an illicit repeater. This alternative configuration is hereinafter referred to as the first modification.

In the first modification, when the vehicle-mounted device 10 receives the Response signal that does not include the illicitness determination data, the controller 13 may perform smart drive. When the vehicle-mounted device 10 receives the Response signal that includes the illicitness determination data, the controller 13 may forbid the activation of the smart drive. Further, when the vehicle-mounted device 10 receives the Response signal that includes the illicitness determination data, the vehicle-mounted device 10 may record, as a log, such a signal reception in a memory of the controller 13.

Further, in the first embodiment, the portable device 20 determines whether wireless communication is established through an illicit repeater. The present disclosure is not limited to such a configuration. For example, the vehicle-mounted device 10 may alternatively determine whether wireless communication is established through an illicit repeater. This alternative configuration is hereinafter referred to as a second modification.

If the Challenge signal is received in the second modification, the portable device 20 may transmit the Response signal that includes data related to over-time change in the magnetic field strength on each axis of the triaxial LF reception antenna 21, which is detected by the axis-specific strength detection circuit 25. The Response signal may include the aforementioned portable device collation code and phase control data.

Further, on the basis of the data related to the over-time change in the magnetic field strength on each axis, which is included in the received Response signal, the controller 13 of the vehicle-mounted device 10 may determine whether wireless communication is established through an illicit repeater similar to the above-described illicitness determination process. In this case, the controller 13 corresponds to the illicitness determination unit. When the controller 13 determines that wireless communication is established through an illicit repeater, the controller 13 may forbids the activation of the smart drive.

The second modification provides similar advantages with the first embodiment. Further, when the controller 13 determines that wireless communication is established through an illicit repeater, the second modification may record, as a log, such a determination result in the memory of the controller 13.

(Second Embodiment)

The present disclosure is not limited to the foregoing embodiment. A second embodiment described below is also included in the technical scope of the present disclosure. The second embodiment will now be described. For the sake of convenience of explanation, members having the same function as the members depicted in the figures used to describe the foregoing embodiment will be designated by the same reference numerals as their counterparts and will not be redundantly described.

The vehicle system 100 according to the second embodiment is similar to the vehicle system 100 according to the first embodiment except in a part of the signal transmission related process in the vehicle-mounted device 10 and in the illicitness determination process of the response related process in the portable device 20.

Figure 11:
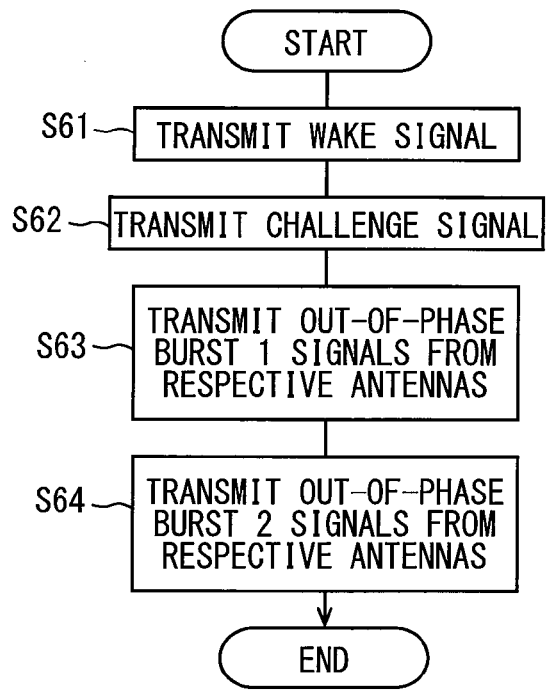
FIG. 11 is a flowchart illustrating an example of a signal transmission related process executed by the vehicle-mounted device according to a second embodiment of the present disclosure.

An example of the signal transmission related process performed by the vehicle-mounted device 10 according to the second embodiment will now be described with reference to the flowchart of FIG. 11. The controller 13 of the vehicle-mounted device 10 may initiate the process shown in the flowchart of FIG. 11 when the user operates the door switch 31 near a vehicle door and the door switch 31 accordingly inputs a signal corresponding to the user operation to the controller 13.

Steps S61 and S62 are performed in similar way with the above-described steps S1 and S2. In the second embodiment, the phase control data included in the Challenge signal indicates the simultaneous transmission of out-of-phase Burst signals is successively carried out by at least two times.

In step S63, the controller 13 instructs the LF transmission unit 11 to simultaneously transmit Burst signals having a predetermined phase difference from the antennas 11a-11c. Upon completion of step S63, the controller 13 proceeds to step S64. When step S63 is performed, the Burst signals having the predetermined phase difference are simultaneously transmitted from the antennas 11a-11c using LF band radio waves as carrier waves. In this case, a rotating magnetic field is generated. For the sake of convenience, the out-of-phase Burst signals that are simultaneously transmitted for the first time are referred to as Burst 1 signals in the second embodiment.

The predetermined phase difference may be set so that a rotating magnetic field is generated in a region where magnetic field generation areas of transmission antennas disposed orthogonal to each other are overlapped with one another. In the second embodiment, it is assumed that three transmission antennas are disposed orthogonal to each other, and the phase difference between the three transmission antennas is set to 120 degrees.

In step S64, the controller 13 instructs the LF transmission unit 11 to simultaneously transmit Burst signals out of phase by 120 degrees from the antennas 11a-11c. Upon completion of step S64, the process comes to an end. When step S64 is performed, the Burst signals out of phase by 120 degrees are simultaneously transmitted from the antennas 11a-11c using LF band radio waves as carrier waves. In this case, a rotating magnetic field is generated. For the sake of convenience, the out-of-phase Burst signals that are simultaneously transmitted for the second time are referred to as Burst 2 signals in the second embodiment.

Figure 12:
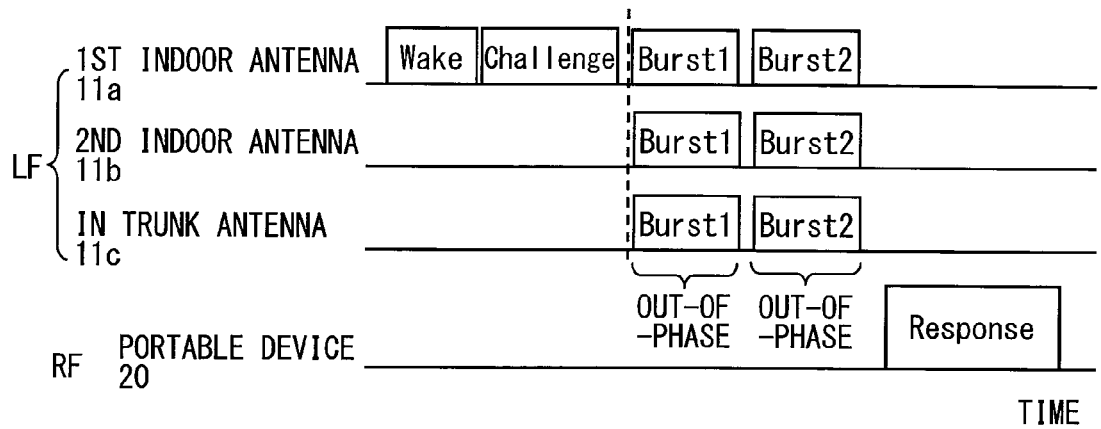
FIG. 12 is a schematic diagram illustrating signals transmitted from the antennas in the second embodiment and a signal replied from the vehicle-mounted device.

The first indoor antenna 11a sequentially transmits the Wake signal and the Challenge signal in the described order as shown in FIG. 12. Subsequently, the antennas 11a-11c simultaneously transmit out-of-phase Burst 1 signals, and then simultaneously transmit out-of-phase Burst 2 signals.

The following will describe the illicitness determination process executed by the portable device 20 according to the second embodiment. The illicitness determination process is a part of the response related process. In the illicitness determination process in the second embodiment, the control circuit 26 compares, on the basis of the phase control data, the magnetic field strength on each axis of the triaxial LF reception antenna 21 during the reception of simultaneously transmitted out-of-phase Burst 1 signals with the magnetic field strength on each axis of the triaxial LF reception antenna 21 during the reception of simultaneously transmitted out-of-phase Burst 2 signals. When the compared magnetic field strengths represent the similar tendency, the control circuit 26 determines that wireless communication is established through an illicit repeater. When the compared magnetic field strengths represent different tendencies, the control circuit 26 determines that wireless communication is not established through an illicit repeater.

As an example, when a strength ratio among the magnetic field strengths on X-axis, Y-axis, and Z-axis remains substantially the same during the reception of the Burst 1 signals and during the reception of the Burst 2 signals, the control circuit 26 may determine that the compared magnetic field strengths represent the same tendency. Here, the expression "substantially the same" signifies that a detected difference is within a range of tolerance.

As described above, the tendency of the magnetic field strength on each axis of the triaxial LF reception antenna 21 changes or maintains without change during the reception of the Burst 1 signals and during the reception of the Burst 2 signals depending on whether the wireless communication is established through an illicit repeater or not. The following will describe details of the change of tendency of the magnetic field strength on each axis of the triaxial LF reception antenna 21.

It is generally believed that a repeater used in a relay attack has a uniaxial antenna in most cases. Therefore, in a case where the wireless communication is established through an illicit repeater, the magnetic field strength on only one particular axis of the triaxial LF reception antenna 21 is high no matter whether the Burst 1 signals or the Burst 2 signals are received.

Figure 13:
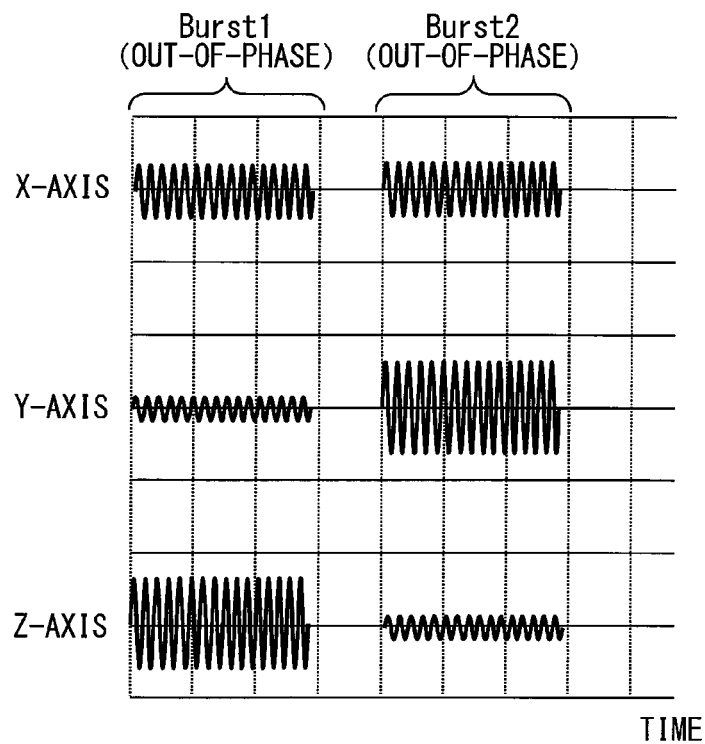
FIG. 13 is a diagram illustrating the illicitness determination process in the second embodiment.

When wireless communication is not established through an illicit repeater, a rotating magnetic field is generated during the reception of the Burst 1 signals and a rotating magnetic field is also generated during the reception of the Burst 2 signals. Therefore, as indicated by an example shown in FIG. 13, an axis having the highest magnetic field strength during the reception of the Burst 1 signals is different from an axis having the highest magnetic field strength during the reception of the Burst 2 signals, which are received posterior to the Burst 1 signals.

Since the magnetic field strengths have the above-described tendency, whether wireless communication is established through an illicit repeater can be determined from the tendency of the magnetic field strength on each axis of the triaxial LF reception antenna 21 during the reception of the Burst 1 signals and during the reception of the Burst 2 signals.

According to the configuration of the present embodiment, whether wireless communication is established through an illicit repeater can be accurately determined on the basis of the magnetic field strength on each axis of the triaxial LF reception antenna 21 during the reception of the simultaneously transmitted out-of-phase Burst 1 signals and the magnetic field strength on each axis during the reception of the simultaneously transmitted out-of-phase Burst 2 signals. This configuration enables the communication between the portable device 20 and the vehicle-mounted device 10 to provide an improved confidentiality and suppress a decrease in responsiveness at the same time. The second embodiment may be combined with the above-described first modification or the second modification.

(Third Embodiment)

The present disclosure is not limited to the foregoing embodiments. A third embodiment described below is also included in the technical scope of the present disclosure. The third embodiment will now be described. For the sake of convenience of explanation, members having the same function as the members depicted in the figures used to describe the foregoing embodiments will be designated by the same reference numerals as their counterparts and will not be redundantly described.

The vehicle system 100 according to the third embodiment is similar to the vehicle system 100 according to the first embodiment except in the signal transmission related process in the vehicle-mounted device 10 and in a part of the response related process in the portable device 20.

Figure 14:
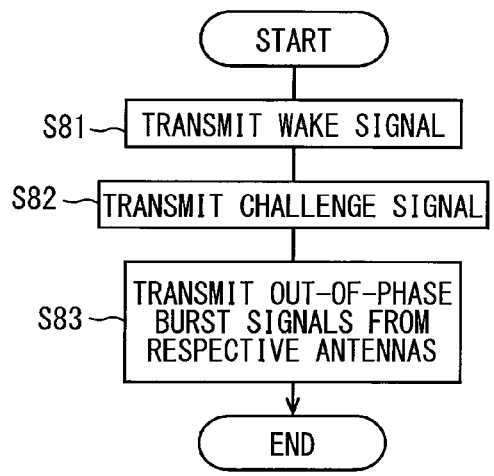
FIG. 14 is a flowchart illustrating an example of the signal transmission related process executed by the vehicle-mounted device according to a third embodiment of the present disclosure.

An example of the signal transmission related process performed by the vehicle-mounted device 10 according to the third embodiment will now be described with reference to the flowchart of FIG. 14. The controller 13 of the vehicle-mounted device 10 may initiate the process shown in the flowchart of FIG. 14 when the user operates the door switch 31 near a vehicle door and the door switch 31 inputs a signal corresponding to the user operation to the controller 13.

Steps S81 and S82 are performed in a similar manner as the above-described steps S1 and S2. In the third embodiment, the phase control data included in the Challenge signal indicates a transmission sequence of out-of-phase Burst signals.

In step S83, the controller 13 instructs the LF transmission unit 11 to simultaneously transmit Burst signals having a predetermined phase difference from the antennas 11a-11c. Upon completion of step S83, the process comes to an end. When step S83 is performed, the Burst signals having the predetermined phase difference are simultaneously transmitted from the antennas 11a-11c using LF band radio waves as carrier waves. In this case, a rotating magnetic field is generated.

As mentioned above, the predetermined phase difference may be set so that a rotating magnetic field is generated in a region where magnetic field generation areas of transmission antennas disposed orthogonal to each other are overlapped. In the third embodiment, it is assumed that three transmission antennas are disposed orthogonal to each other and the phase difference between the three transmission antennas is set to 120 degrees.

Figure 15:
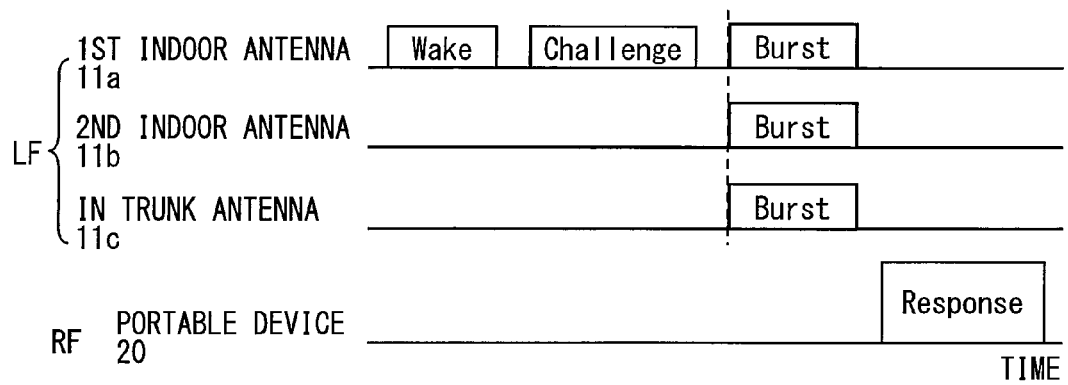
FIG. 15 is a schematic diagram illustrating signals transmitted from the antennas in the third embodiment and a signal replied from the vehicle-mounted device.

The first indoor antenna 11a sequentially transmits the Wake signal and the Challenge signal in the described order as shown in FIG. 15. Subsequently, the antennas 11a-11c simultaneously transmit out-of-phase Burst signals.

The following will describe the illicitness determination process executed by the portable device 20 according to the third embodiment. The illicitness determination process is a part of the response related process. In the illicitness determination process in the third embodiment, the control circuit 26 compares, on the basis of the phase control data, over-time changes in the magnetic field strengths on individual axes of the triaxial LF reception antenna 21 during the reception of simultaneously transmitted out-of-phase Burst signals.

When the axis having the highest magnetic field strength among the X-axis, Y-axis, and Z-axis switches to another axis over time, the control circuit 26 determines that wireless communication is not established through an illicit repeater. When the axis having the highest magnetic field strength among the three axes does not switch to another axis over time, the control circuit 26 determines that wireless communication is established through an illicit repeater.

As described above, the tendency of the over-time change of the magnetic field strength on each axis of the triaxial LF reception antenna 21 changes or maintains without change depending on whether the wireless communication is established through an illicit repeater or not. The following will describe details of the change of tendency of the magnetic field strength on each axis of the triaxial LF reception antenna 21.

Figure 16A:
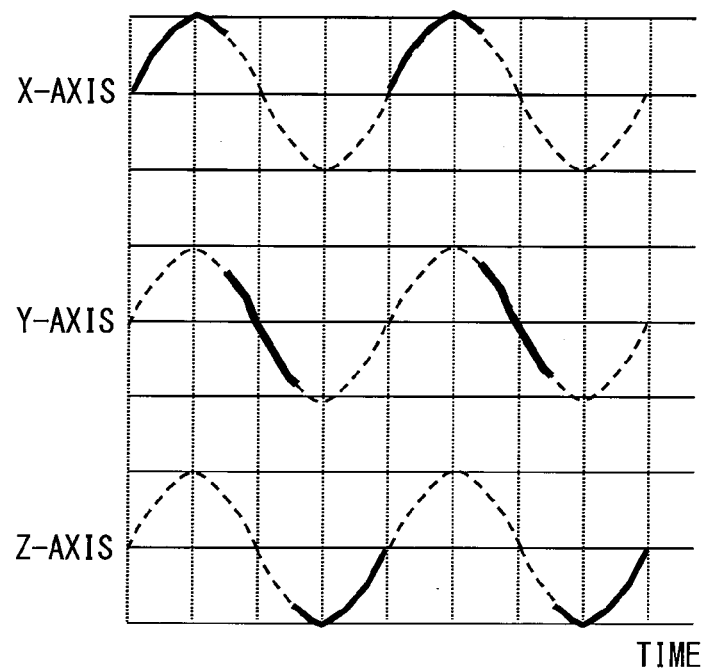
FIGS. 16A and 16B are diagrams illustrating the illicitness determination process in the third embodiment.
Figure 16B:
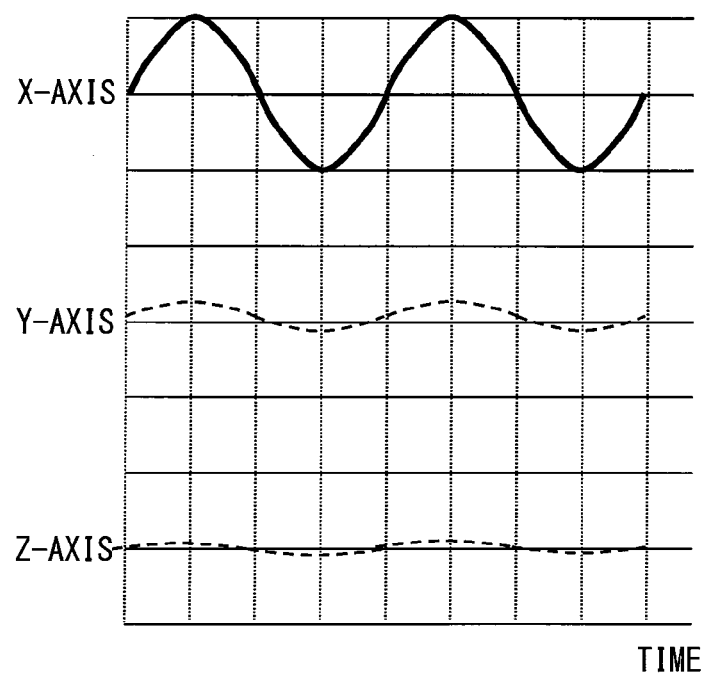

It is generally believed that a repeater used in a relay attack has a uniaxial antenna in most cases. Therefore, when wireless communication is established through an illicit repeater, the magnetic field strength on only one particular axis of the triaxial LF reception antenna 21 is always high as shown in FIG. 16B.

When wireless communication is not established through an illicit repeater, a rotating magnetic field is generated during the reception of the Burst signals. Therefore, as indicated by an example shown in FIG. 16A, an axis having the highest magnetic field strength switches to another axis over time.

Since the magnetic field strengths have the above-described tendency, whether wireless communication is established through an illicit repeater can be determined from the tendency of over-time changes in the magnetic field strengths on the individual axis of the triaxial LF reception antenna 21 during the reception of simultaneously transmitted out-of-phase Burst signals.

According to the configuration of the third embodiment, whether wireless communication is established through an illicit repeater can be accurately determined on the basis of temporal changes in the magnetic field strengths on individual axes of the triaxial LF reception antenna 21 during the reception of the simultaneously transmitted out-of-phase Burst signals. This configuration enables the communication between the portable device 20 and the vehicle-mounted device 10 to provide an improved confidentiality and suppress a decrease in responsiveness at the same time. The third embodiment may be combined with the above-described first modification or the second modification.

Further, it is preferred in the third embodiment that the axis-specific strength detection circuit 25 is configured to sequentially detect the magnetic field strength on each of the X-axis, Y-axis, and Z-axis of the triaxial LF reception antenna 21 at multiplied intervals. Such a configuration of the axis-specific strength detection circuit 25 makes it possible to use a decreased sampling frequency and reduce the power consumption of the portable device 20.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle system performing a control to a vehicle, the vehicle system comprising:
a vehicle-mounted device mounted to the vehicle; and
a portable device portable by a user, wherein
the vehicle-mounted device is capable of establishing a wireless communication with the portable device and the control to the vehicle is activated corresponding to a result of a collation performed based on the wireless communication established between the vehicle-mounted device and the portable device,
the vehicle-mounted device includes a vehicle-mounted transmission unit which simultaneously transmits at least two radio waves having a predetermined phase difference from one another using at least two transmission antennas, and the at least two transmission antennas are disposed orthogonal to each other among a plurality of transmission antennas disposed in the vehicle,
the portable device includes:
a triaxial reception antenna receiving the at least two radio waves transmitted from the at least two transmission antennas; and
a magnetic field strength detection unit detecting a magnetic field strength on each of three axes of the triaxial reception antenna, and
one of the vehicle-mounted device or the portable device includes an illicitness determination unit determining, based on the magnetic field strength detected by the magnetic field strength detection unit on each of the three axes, whether the wireless communication is established through an illicit repeater,
the three axes of the triaxial reception antenna include a first axis, a second axis, and a third axis, and
when a ratio among the magnetic field strengths on the first axis, on the second axis, and on the third axis during the reception of the at least two radio waves having the same phase is substantially equal to a ratio among the magnetic field strengths on the first axis, on the second axis, and on the third axis during the reception of the at least two radio waves having the predetermined phase difference, the illicitness determination unit determines that the tendency of the magnetic field strength on each of the three axes of the triaxial reception antenna, which relates to the at least two radio waves having the same phase and simultaneously transmitted from the at least two transmission antennas, is identical to the tendency of the magnetic field strength on each of the three axes of the triaxial reception antenna, which relates to the at least two radio waves having the predetermined phase difference and simultaneously transmitted from the at least two transmission antennas.

2. The vehicle system according to claim 1, wherein
the vehicle-mounted transmission unit controls the at least two transmission antennas disposed orthogonal to each other to simultaneously transmit at least two radio waves having a same phase prior to a simultaneous transmission of the at least two radio waves having the predetermined phase difference,
the illicitness determination unit compares the magnetic field strength on each of the three axes of the triaxial reception antenna, which is detected by the magnetic field strength detection unit during a reception of the at least two radio waves having the same phase by the triaxial reception antenna, with the magnetic field strength on each of the three axes of the triaxial reception antenna, which is detected by the magnetic field strength detection unit during a reception of the at least two radio waves having the predetermined phase difference by the triaxial reception antenna,
the illicitness determination unit determines that the wireless communication is established through the illicit repeater when a tendency of the magnetic field strength on each of the three axes of the triaxial reception antenna, which relates to the at least two radio waves having the same phase and simultaneously transmitted from the at least two transmission antennas, is identical to a tendency of the magnetic field strength on each of the three axes of the triaxial reception antenna, which relates to the at least two radio waves having the predetermined phase difference and simultaneously transmitted from the at least two transmission antennas, and
the illicitness determination unit determines that the wireless communication is not established through the illicit repeater when the tendency of the magnetic field strength on each of the three axes of the triaxial reception antenna, which relates to the at least two radio waves having the same phase and simultaneously transmitted from the at least two transmission antennas, is different from the tendency of the magnetic field strength on each of the three axes of the triaxial reception antenna, which relates to the at least two radio waves having the predetermined phase difference and simultaneously transmitted from the at least two transmission antennas.

3. The vehicle system according to claim 1, wherein
the vehicle-mounted transmission unit controls the at least two transmission antennas disposed orthogonal to each other to simultaneously transmit the at least two radio waves having the predetermined phase difference as first radio waves, and then the vehicle-mounted transmission unit controls the at least two transmission antennas disposed orthogonal to each other to simultaneously transmit at least two radio waves having the predetermined phase difference as second radio waves,
the illicitness determination unit compares the magnetic field strength on each of the three axes of the triaxial reception antenna, which is detected by the magnetic field strength detection unit during a reception of the first radio waves by the triaxial reception antenna, with the magnetic field strength on each of the three axes of the triaxial reception antenna, which is detected by the magnetic field strength detection unit during a reception of the second radio waves by the triaxial reception antenna,
the illicitness determination unit determines that the wireless communication is established through the illicit repeater when a tendency of the magnetic field strength on each of the three axes of the triaxial reception antenna, which relates to the first radio waves, is identical to a tendency of the magnetic field strength on each of the three axes of the triaxial reception antenna, which relates to the second radio waves, and
the illicitness determination unit determines that the wireless communication is not established through the illicit repeater when the tendency of the magnetic field strength on each of the three axes of the triaxial reception antenna, which relates to the first radio waves, is different from the tendency of the magnetic field strength on each of the three axes of the triaxial reception antenna, which relates to the second radio waves.

4. The vehicle system according to claim 3, wherein
the three axes of the triaxial reception antenna include a first axis, a second axis, and a third axis, and
when a ratio among the magnetic field strengths on the first axis, on the second axis, and on the third axis during the reception of the first radio waves is substantially equal to a ratio among the magnetic field strengths on the first axis, on the second axis, and on the third axis during the reception of the second radio waves, the illicitness determination unit determines that the tendency of the magnetic field strength on each of the three axes of the triaxial reception antenna, which relates to the first radio waves, is identical to the tendency of the magnetic field strength on each of the three axes of the triaxial reception antenna, which relates to the second radio waves.

5. The vehicle system according to claim 1, wherein
the illicitness determination unit compares over-time changes in multiple sets of the magnetic field strengths on the three axes of the triaxial reception antenna, which are successively detected by the magnetic field strength detection unit during a successive reception of multiple sets of the at least two radio waves transmitted simultaneously and having the predetermined phase difference,
the illicitness determination unit determines that the wireless communication is not established through the illicit repeater when one of the three axes on which a highest magnetic field strength is detected switches to another axis over time, and
the illicitness determination unit determines that the wireless communication is established through the illicit repeater when one of the three axes on which the highest magnetic field strength is detected does not switch to another axis over time.

6. The vehicle system according to claim 5, wherein
the magnetic field strength detection unit successively detects the multiple sets of the magnetic field strengths at multiplied intervals.

7. The vehicle system according to claim 1, wherein,
in a transmission of the at least two radio waves having the predetermined phase difference, when a total number of the at least two transmission antennas disposed orthogonal to each other is two, the vehicle-mounted transmission unit transmits two radio waves corresponding to the two transmission antennas in such a manner that the phase difference between the two radio waves is set to 90 degrees from one another, and
in a transmission of the at least two radio waves having the predetermined phase difference, when a total number of the at least two transmission antennas disposed orthogonal to each other is three, the vehicle-mounted transmission unit transmits three radio waves corresponding to the three transmission antennas in such a manner that the phase difference among the three radio waves is set to 120 degrees from one another.

8. A portable device portable by a user and being communicably connected to a vehicle-mounted device mounted to a vehicle in a wireless manner, the portable device comprising:

a triaxial reception antenna equipped to the vehicle and receiving radio waves transmitted from a plurality of transmission antennas, and the plurality of transmission antennas including at least two transmission antennas disposed orthogonal to each other;
a magnetic field strength detection unit detecting a magnetic field strength on each of three axes of the triaxial reception antenna; and
an illicitness determination unit, wherein
the vehicle-mounted device includes a vehicle-mounted transmission unit that simultaneously transmits at least two radio waves having a predetermined phase difference from the at least two transmission antennas disposed orthogonal to each other, and
upon a receipt of the at least two radio waves having the predetermined phase difference and transmitted simultaneously from the vehicle-mounted transmission unit, the illicitness determination unit determines whether a wireless communication is established through an illicit repeater based on the detected magnetic field strength on each of the three axes,
wherein the illicitness determination unit determines that the tendency of the magnetic field strength on each of the three axes of the triaxial reception antenna, which relates to the at least two radio waves having the same phase and simultaneously transmitted from the at least two transmission antennas, is identical to the tendency of the magnetic field strength on each of the three axes of the triaxial reception antenna, which relates to the at least two radio waves having the predetermined phase difference and simultaneously transmitted from the at least two transmission antennas.

9. A vehicle-mounted device mounted to a vehicle and being communicably connected to a portable device portable by a user, the vehicle-mounted device comprising:
a vehicle-mounted transmission unit simultaneously transmitting at least two radio waves having a predetermined phase difference from at least two transmission antennas disposed orthogonal to each other among a plurality of transmission antennas equipped to the vehicle; and
an illicitness determination unit, wherein
the portable device includes:
a triaxial reception antenna receiving the at least two radio waves transmitted from the at least two transmission antennas; and
a magnetic field strength detection unit detecting a magnetic field strength on each of the three axes of the triaxial reception antenna,
upon a receipt of the at least two radio waves having the predetermined phase difference and transmitted simultaneously from the vehicle-mounted transmission unit, the portable device transmits the magnetic field strength on each of the three axes, which is detected by the magnetic field strength detection unit, to the illicitness determination unit, and
the illicitness determination unit determines whether a wireless communication is established through an illicit repeater based on the magnetic field strength on each of the three axes, which is detected by the magnetic field strength detection unit and transmitted from the portable device,
wherein the illicitness determination unit determines that the tendency of the magnetic field strength on each of the three axes of the triaxial reception antenna, which relates to the at least two radio waves having the same phase and simultaneously transmitted from the at least two transmission antennas, is identical to the tendency of the magnetic field strength on each of the three axes of the triaxial reception antenna, which relates to the at least two radio waves having the predetermined phase difference and simultaneously transmitted from the at least two transmission antennas.

\* \* \* \* \*